United States Patent [19]

Steinberg

[11] 3,845,480

[45] Oct. 29, 1974

[54] PARTICULATE DETECTOR SYSTEM

[75] Inventor: Samuel B. Steinberg, Baltimore, Md.

[73] Assignee: Air Techniques, Inc., Baltimore, Md.

[22] Filed: Feb. 20, 1973

[21] Appl. No.: 333,625

[52] U.S. Cl. ................ 340/236, 340/237.5, 356/207
[51] Int. Cl. ........................ G01h 21/12, G08b 17/10
[58] Field of Search ............. 340/236, 237.5, 239 R; 250/218; 356/103, 207, 208, 104

[56] References Cited

UNITED STATES PATENTS

| | | | |
|---|---|---|---|
| 1,746,525 | 2/1930 | Darrah | 340/237 R |
| 1,994,768 | 3/1935 | Holven et al. | 356/103 X |
| 2,699,538 | 1/1955 | Nickel | 340/237.5 |
| 2,732,753 | 1/1956 | O'Konski | 356/207 |
| 3,551,672 | 12/1970 | Homer et al. | 340/236 UX |

*Primary Examiner*—John W. Caldwell
*Assistant Examiner*—Daniel Myer
*Attorney, Agent, or Firm*—Walter G. Finch

[57] ABSTRACT

The dust particle content in the environment of a magnetic disc storage device is continuously monitored. The particles are passed through a scattering chamber and monitored by a photo cell. When the particle content approaches an undesirable level, the photo cell develops a signal which is fed to and operates a detection circuit which controls an alarm to indicate undesirable content level.

10 Claims, 2 Drawing Figures

PARTICULATE DETECTOR SYSTEM

This invention relates generally to a particulate detection system, and more particularly it pertains to a system for detecting the approaching of a particulate level beyond a desired level and a warning thereof.

In many present manufacturing and equipment operations, it is desirable to maintain the dust particulate level below an acceptable upper limit. With efforts being made to control the pollution of the atmosphere, the need becomes even more critical. Further, certain types of equipment operate inefficiently and often fail completely when operated in a dusty environment.

An example of such equipment is in the data storage area where a disc drive storage device is used in conjunction with computor systems to store data. A magnetic head moves across the surface of a magnetic storage disc to assist in the transfer of data between the head and the disc. If the dirt buildup in the area where the head is moving exceeds a certain level, the head will literally crash into the disc causing considerable damage to the facilities. This necessitates costly repairs such as replacing the disc and head and maintenance efforts associated therewith. In addition, data storage time and space are lost.

Even though high-efficiency filter systems are used to filter the dust in these areas, the dirt and dust particles still accumulate in the path of the moving head and frequently cause the damaging crash between the head and the disc. Therefore a means is needed for drawing a sample of the particulate environment in the area of the path of movement of the head.

Although the need for such a particulate monitoring and alarm system has been demonstrated with respect to a disc drive storage device, the need extends into many other areas where particulate level should be controlled.

It is an object of the present invention, therefore, to provide a system for detecting the particulate level of an area.

A further object of this invention is to provide a particulate monitoring and detection system with alarm features for indicating the approach of a particulate content to an undesirable level.

Another object of this invention is to provide a particulate sampling system which triggers a detector and indicator when the level of sampled particulate exceeds an acceptable upper limit.

Figure 1:
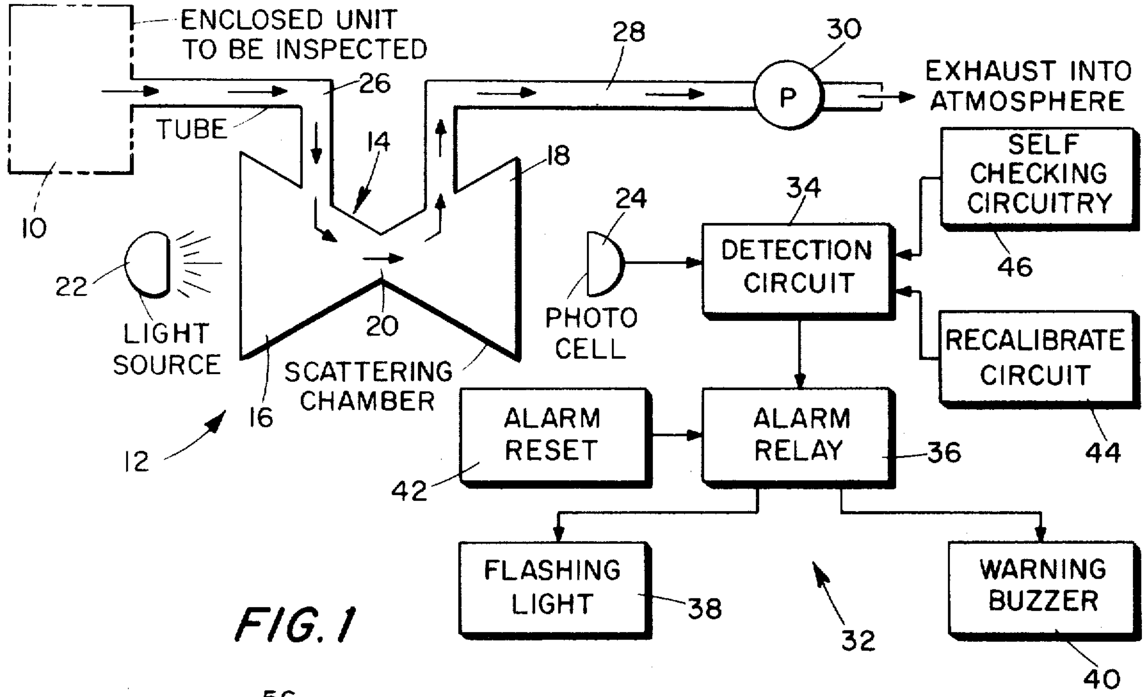
Figure 2:
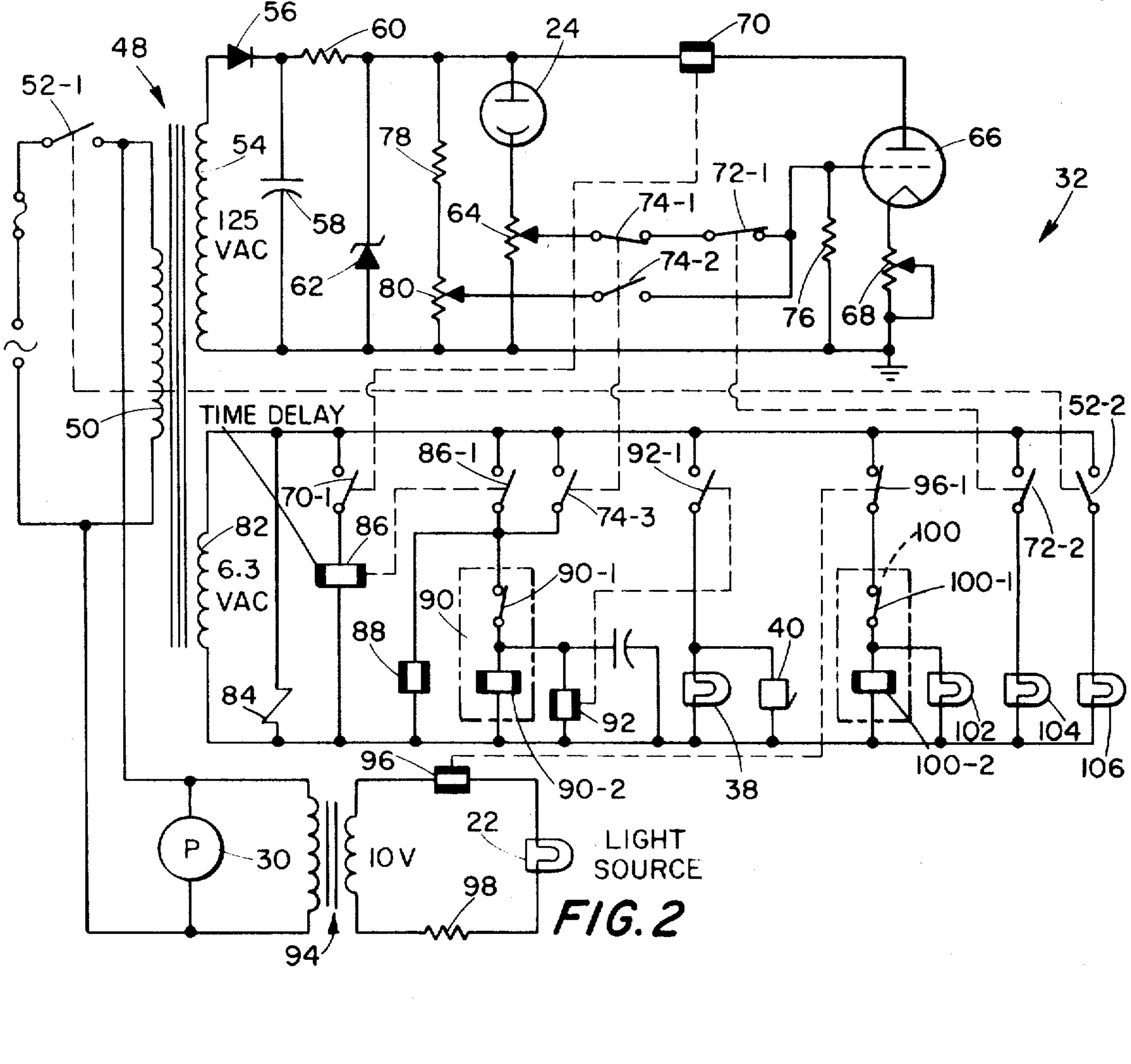

Other objects and attendant advantages of this invention will become more readily understood from the following detailed specification and accompanying drawings in which:

FIG. 1 is a schematical and block diagram of a particulate detector system incorporating features of this invention; and FIG. 2 is a circuit diagram showing electrical features of detector and alarm facilities of the system of FIG. 1.

Referring now to FIG. 1 of the drawings, an enclosed unit 10 includes operating facitlies which should be permitted to operate in a dust free environment or at least one of a low dust-particulate content. Such operating facilities could include, for example a disc drive storage device (not shown) which is used to store data in computer systems. The storage device includes a magnetic head which moves adjacent to a magentic disc. If dust or dirt particles accumulate in the path of the head, the head will literally crash into the disc and destroy or damage both the disc and the head.

In order to insure that dust particulate content, the environment in which the head moves is maintained below a certain level, a particulate monitoring system 12 continuously monitors the particulate content. The monitoring system 12 includes a scattering chamber 14 having a "light" section 16 and a "darkness" section 18. Each of the sections 16 and 18 have the shape of a frustum of a cone and are joined at the smaller ends thereof by a communicating passageway 20. A light source 22 directs rays of light into the "light" section. A photo cell 24 is positioned adjacent to the section 18. A tube 26 is connected between the unit 10 and the "light" section 16. Another tube 28 is connected between the "darkness" section and a suction pump 30.

In operation, the suction pump 30 is operated to draw a sampling of the particulate matter from the unit 10, through the scattering chamber 14 and into the atmosphere adjacent to the pump 30. As the particulate matter moves through the "light" section 16 and into the "darkness" section 18, the photo cell 24 senses the light reflection of particles in the "darkness" section. The sensitivity of the photo cell 24 is adjusted to develop a signal when the content level of particulate matter in the "darkness" section 18 exceeds an established value.

A detector and alram system 32 includes a detection circuit 34 and an alarm relay 36 which controls a flashing light 38 and a warning buzzer 40. The signal developed by the photo cell 24, when the particulate level exceeds an acceptable level, is fed to the detection circuit 34 which operates the alarm relay 36. Upon operation of the alarm relay 36, the flashing light 38 and warning buzzer 40 are operated to provide indication of the approach of the particulate content within the unit 10 to an undesirable level.

An alarm reset 42 is provided for resetting the alarm relay 36 when desired. For example, if the alarm relay 36 should operate accidentally or because the detection circuit is set too low, the reset 42 can be used to deactuate the relay and thereby stop the flashing light 38 and warning buzzer 40. A recalibrate circuit 44 can then be used to adjust the detection circuit 34 to operate at a desired level. Also, self checking circuitry 46 is provided for indicating various conditions of the detector and alarm system 32 during the operation of the system.

As shown in FIG. 2, the detector and alarm system 32 is powered by an alternating current source through a transformer 48. The primary winding 50 is connected in series with a power-on switch 52–1 and the power source. One secondary winding 54 is connected to and applies 125 volts AC to a DC power supply which includes a diode 56, a filter capacitor 58, a bleeding resistor 60 and a zener diode 62. The photo cell 24, which is a photo-resistance device which changes resistance with a change in light intensity, is connected in series with a potentiometer 64. This series combination is connected across the DC power supply so that current flow through the potentiometer 64 varies with the light intensity reflected on the photo cell 24.

A triode vacuum tube 66 has its cathode which is connected through a self-bias rheostat 68 to a ground side of the DC power supply. The plate of the vacuum tube 66 is connected through a relay coil 70 to the other side of the DC power supply. The center arm of the potentiometer 64 is connected to the grid of the tube 66 through two normally closed switches 72–1 and 74–1. A shunting resistor 76 is connected between the grid of the tube 66 and the ground side of the DC power supply.

A voltage divider circuit includes a resistor 78 and a potentiometer 80 connected in series and across the DC power supply. The center arm of the potentiometer 80 is connected to a normally open switch 74–2 which is, in turn, connected to the grid of the tube 66. The switch 74–2 is connected mechanically to the switch 74–1 for synchronous operation.

Another secondary 82 of the transformer 48 applies 6.3 volts AC to remaining components of the detector and alarm system 32. The filaments 84 of the tube 66 are connected across the secondary 82 as is a series combination of a time-delay relay 86 and a contact 70–1 of the relay coil 70. A contact 86–1 of the time-delay relay 86 is connected in series with a parallel combination of a customer-auxiliary relay coil 88 and a flasher 90.

The flasher 90 includes a normally closed contact 90–1 and a control coil 90–2. When contact 86–1 is closed, current flows through the coil 90–2 to open the contact 90–1. When the contact 90–1 opens, current ceases to flow through the coil 90–2 whereby the contact 90–1 closes. This pattern continues to provide intermittent operation of the flasher 90. A relay coil 92 is connected in paralled with the flasher coil 90–2 so that the relay coil is energized intermittently with the flasher coil. The relay coil 92 controls a contact 92–1 which is connected in series separately with the flashing light 38 and the warning buzzer 40. The flashing light 38 is red to indicate the approach of the particulate content level to the undesirable value.

Another transformer 94 is also connected, through the switch 52–1, to the alternating current source and facilitates the application of 10 volts AC to the light source 22. The light source 22 is connected in series with a lamp-fail relay coil 96 and a current limiting resistor 98. When the light source 22 fails, the coil 96 controls an associated contact 96–1 to close the contact. When the contact 96-1 closes, operating power is applied to a flasher 100; including a normally closed contact 100–1 and a control coil 100–2; which causes a lamp 102 to flash intermittently thereby indicating the failure of the light source 22.

The pump 30 is also connected, through the switch 52–1, to the alternating current source.

A switch 72–2, which is attached mechanically to the switch 72–1, is connected in series with a reset-indicator lamp 104 to indicate the resetting of the alarm relay 36 (FIG. 1) and the system assoicated therewith.

A switch 52–2 is mechanically attached to the switch 52–1 and is connected in series with a power-on lamp 106. When the switch 52–1 is closed, the switch 52–2 is also closed to illuminate the lamp 106 to incicate that the power is on.

In operation, the particulate matter from the unit 10 is passed through the chamber 14 where the photo cell 24 senses the particulate matter by light reflection from the light source 22. This alters the resistance of the photo cell 24 in the circuit illustrated in FIG. 2. Consequently, the current flow through the photo cell 24 and the potentiometer 64 is varied and the voltage level appearing at the center arm of the potentiometer increases.

When the content level of particulate matter within the scattering chamber 14, and consequently in the unit 10, approaches an undesirable level, the voltage level appearing at the center arm of the potentiometer 64 is sufficient to condition the grid of the tube 66 whereby the tube fires and current flows therethrough. At this time, current flows through the relay coil 70 whereby the assoicated contact 70–1 is closed. When the contact 70–1 is closed, the time-delay-relay 86 is conditioned to close its associated contact 86–1 after a period of 2 minutes has passed providing that the current continues to flow through the coil 70. This means that the particulate level which caused the tube 66 to fire must continue to pass through the chamber 14 for at least 2 minutes. If it does not, then the dangerous level is not sustained long enough to apparently cause the damage within the unit 10. Thus the equipment within the unit 10 can continue to operate without immediate concern of damage to internal facilites.

If the time-delay relay 86 remains operated for at least two minutes, the contact 86–1 is closed to apply operating current to relay coil 88. The contacts associated with the coil 88 are available for use by the user of the system 32 to control other circuits such as a distant alarm.

In addition, the flasher 90 is operated to intermittently operate the relay coil 92 whereby the contact 92–1 is closed intermittently. This facilitates the intermittent operation of the flashing light 38 and the warning buzzer 40 to indicate that the particulate matter level is approaching the undesirable level. The alarm signal indicates that the operation of the equipment within the unit 10 must be stopped and the interior of the unit cleaned and cleared of dust and dirt particulate matter before the equipment can be operated without concern for damage.

Of course, this system could be used to detect and indicate the dangerous particulate matter level for any environment and need not be limited to the specific use described herein.

The operation of the tube 66 is determined by the self bias obtained through the rheostat 68 and the grid bias obtained through the potentiometer 64 and the shunt resistor 76. The settings of the rheostat 68 and the potentiometer 64 are established to insure that the tube 66 fires when a predetermined particulate level is reached, that level being just below the level which would cause damage to the equipment within the unit 10.

If it is desired to check the firing level of the tube 66 and to recalibrate if necessary, the switch 74–1 is opened, and the switch 74–2 is thereby closed. When the switch 74–1 is opened, the center arm of the potentiometer 64 is no longer connected to the grid of the tube 66. However, the center arm of the potentiometer 80 is now connected through the closed switch 74–2 to the grid of the tube 66. The center arm of the potentiometer 80 has been previously adjusted to provide a voltage representative of the particulate level to be detected.

If the self-bias rheostat 68 is set to above a certain level, the tube 66 will fire. The rheostat 68 should be adjusted to a setting where the tube 66 just fires. If the tube 66 does not fire when the switch 74–2 is closed, the rheostat 68 should be adjusted until the tube fires.

In either case, the tube 66 is calibrated to fire when the particulate level to be detected is reached. This calibration feature is particularly useful when the necessity arises for calibrating the system 32 without disconnecting the system from the equipment being monitored. Once the calibration is complete, the switches 74–1 and 74–2 are reversed and the system 32 is again ready for use.

If the alarm system is operated erroneously for any reason, the system 32 can be reset by opening the switch 72–1. This removes the grid bias from the tube 66 so that the tube no longer operates. Current ceases to flow through the coil 70. The cause of the erroneous alarm can be corrected and the switch 72–1 can then be closed in preparation for the continuing detection operation. When the switch 72–1 is opened, the switch 72–2 is closed whereby the lamp 104 is illuminated to indicate that the system 32 is being reset.

What is claimed is:

1. A system for detecting particulate level content within a selected environment, comprising, means for providing a confined passageway for movement of particulate matter there-through, means for moving a sampling of particulate matter from the selected environment and through the passageway of the providing means, means responsive to the content level of the particulate matter being moved through the confined passageway for developing a signal at least when the content level is at a predetermined level, means for indicating the development of the signal by the developing means to indicate that the content level of the particulate matter has reached at least the predetermined level, and means responsive to the development of the signal by the developing means for operating the indicating means, the operating means including a detection circuit which operates in response to the signal developed by the developing means to generate a signal, the detection circuit including a vacuum tube triode circuit having adjustable cathode self-bias and a grid-bias circuit for controlling operation of the tube in response to the signal developed by the developing means, and means for applying a predetermined potential to the grid-bias circuit in place of a potential normally applied thereto when the developed signal is applied to the grid-bias circuit so that the self-bias can be adjusted to calibrate the tube to operate precisely when the developed signal is subsequently applied to the gird-bias circuit, said predetermined potential being representative of the predetermined level of particulate material which is to be detected.

2. The system as recited in claim 1 wherein the operating means further include relay means operable in response to the generated signal of the detection circuit for controlling the indicating means for operation thereof.

3. The system as recited in claim 1, and means for delaying the operation of the indicating means for a predetermined period after the developing means has developed the signal to determine whether the content level is sustained at least at the predetermined level for the predetermined period.

4. The system as recited in claim 1, wherein the providing means includes a scattering chamber having a particulate entry section and a particulate exit section, the entry section communicating with the exit section by the confined passageway.

5. The system as recited in claim 1, wherein the moving means includes a suction pump for drawing the sample of particulate matter from the selected environment and through the providing means.

6. The system as recited in claim 1, wherein the developing means includes a light positioned adjacent to a portion of the providing means and directing light rays onto the particulate matter being moved through the providing means, and a photo cell positioned adjacent to another portion of the providing means in a position to be sensitive to light reflected from the particulate matter passing through the providing means for developing the signal when the content level reaches at least the predetermined level.

7. The system as recited in claim 1, and means for calibrating the detection circuit to respond and operate when the developing means develops the signal.

8. The system as recited in claim 1, wherein the indicating means includes a lamp, and a buzzer.

9. The system as recited in claim 1, and means for operating the indicating means intermittently.

10. A system for detecting particulate level content within a selected environment, comprising, means for providing a single confined passageway for movement of particulate matter therethrough, means for moving a sampling of particulate matter from the selected environment and through the single passageway of the providing means, means responsive solely to the presence and content level of the particulate matter being moved through the single confined passageway for developing a signal at least when the content level is at a predetermined level, means for indicating the development of the signal by the developing means to indicate the presence of the particulate matter and that the content level thereof has reached at least the predetermined level, and means responsive to the development of the signal by the developing means for operating the indicating means, the operating means including a detection circuit which operates in respone to the signal developed by the developing means to generate a signal, and relay means operable in response to the generated signal of the detection circuit for controlling the indicating means for operation thereof, the detection circuit including a vacuum tube triode circuit having adjustable cathode self-bias and a grid-bias circuit for controlling operation of the tube in response to the signal developed by the developing means, and means for applying a predetermined potential to the grid-bias circuit in place of a potential normally applied thereto when the developed signal is applied to the grid-bias circuit so that the self-bias can be adjusted to calibrate the tube to operate precisely when the developed signal is subsequently applied to the grid-bias circuit, said predetermined potential being representative of the predetermined level of particulate material Which is to be detected.

* * * * *